CHARLES H. CONEY
WILLIE E. DRAPER
INVENTORS

ATTORNEYS

United States Patent Office 3,409,449
Patented Nov. 5, 1968

3,409,449
INK COMPOSITION AND SOLVENT
FOR USE THEREIN
Charles H. Coney and Willie E. Draper, Kingsport, Tenn., assignors to Eastman Kodak Company, Rochester, N.Y., a corporation of New Jersey
Filed Oct. 5, 1965, Ser. No. 493,115
7 Claims. (Cl. 106—30)

ABSTRACT OF THE DISCLOSURE

Solvent blends for dissolving the resin component of a moisture-set ink composition consisting essentially of 2,2,4-trimethyl-pentanediol-1,3 and diethylene glycol.

---

This invention relates to low-cost resin compositions. More particularly, it relates to low-cost resin/glycol blends and resin solvents useful in the printing ink industry.

Moisture-set inks are commonly used for printing packaging materials such as bread labels, food containers such as paper drinking cups, thick cartonboards, and paper bags. These inks are made up of resins dissolved in a glycol solvent. They dry by precipitation and absorption and can generally tolerate only about 10% water. After printing, that is, application to the desired surface, the inked substrate is subjected to a jet of steam or similar moisture-containing fluid such as a fine mist of water. This combines with the ink and precipitates the resin binder from the glycol solvent to produce a rapid, firm, continuous film known to the art as a dry or set, thereby fixing whatever pigment may be present in inks to the substrate, surface or stock with absorption of the diluted solvent into the printed substrate, surface or stock.

While such inks have generally been successful in producing the desired markings, the glycols used therein as solvents have proved to have certain disadvantages. For example, sometimes they have not been as tolerant of water as desired and somewhat lacking in the ability to produce the desired viscosity. Occasionally a further disadvantage has been encountered in that the glycols thus far known as solvents have proved to be incapable of dissolving certain low-cost resins called limed rosins. Therefore, it is apparent that production of a new ink composition capable of being adjusted to the desired viscosity for use in printing packaging materials and one which will tolerate water as well as containing a glycol which will dissolve limed rosin as well as resins heretofore known as ingredients of such ink compositions represents a highly desirable result. After extended investigation we have found a glycol combination which will dissolve limed rosin and other resins known as useful in printing ink compositions and which will produce a printing ink or lacquer which is tolerant of water and of a desirable viscosity.

One object of this invention is to provide a glycol mixture useful as a solvent for resins used in moisture-set inks or varnishes. Another object is to provide a moisture-set ink composition which contains resins heretofore not usable in such compositions due to their insolubility in the glycol solvents used therein. A further object is to provide a method of preparing a moisture-set ink composition of controllable water tolerance and improved viscosity.

In its broader aspects our invention involves use of a 2,2,4-trimethylpentanediol-1,3 (hereinafter referred to as TMPD)/diethylene glycol (hereinafter referred to as DEG) mixture as a solvent for resins used in moisture-set ink varnishes or related compositions. TMPD is an 8-carbon solid dihydric alcohol. The TMPD/DEG mixture or composition of this invention is useful for dissolving resins such as maleic or maleated rosins and limed rosins, including limed wood rosins, the limed rosins having been heretofore of insufficient solubility in known glycols usable in moisture-set inks to be practical. These TMPD/DEG mixtures may contain from about 20 to 60% by weight TMPD. We have found a 50–50 mixture, that is, 50% by weight of each component, to give optimum results in producing the desirable viscosity, water resistance, and other desired properties for the inks in which used. The ink compositions containing the TMPD/DEG mixture according to our invention include preferably 44 to 6% by weight pigment, 6 to 44% by weight resin, 45 to 5% by weight TMPD and 5 to 45% by weight DEG. Our preferred ink composition contains 30 to 20% by weight pigment, 20 to 30% by weight resin, preferably limed rosin, 30 to 20% by weight TMPD and 20 to 30% by weight DEG.

According to our invention the moisture-set ink vehicles are prepared by dissolving the binder, that is, the resin, in the glycol blend, that is, a blend of TMPD and DEG. The coloring agent, pigment or dye may then be added. Representative coloring agents, pigments or dyes which may be used are carbon black, India red, chrome yellow, titanium dioxide, phthalocyanine blue, phthalocyanine green, molybdate orange, iron blue, zinc yellow, watchung red, BON red, and iron oxide. The solution is preferably accomplished by heating, for example, at about 150°, with some agitation for several minutes, preferably about 10.

For a better understanding of our invention reference is now made to the drawing, which forms a part hereof.

In the drawing:

FIG. 1 is a graph illustrating how the replacement of a portion of DEG with TMPD according to this invention improves the water tolerance of several different moisture-set inks or varnishes which we have tested. The improved water tolerance indicates a better press stability. Where the water tolerance is fairly high, water may be added to the varnish or ink to control the set time of the printed film.

FIG. 2 is a graph showing the effect of increasing the amount of TMPD on the viscosity of various moisture-set ink resins. The water concentration at kick-out point (point at which sufficient water added to precipitate the binder resin in the ink) is plotted against weight percent TMPD. Thus the effect of TMPD on water tolerance is shown.

In FIGS. 1–4 the resins used in the ink compositions were as follows:

highly successful when used according to our invention are shown in the following table (Table 1).

| Item | Resin Name | Type | Supplier | Melting Point (Range) °C. | Acid No. | Color Gardner [1] | Color USDA [2] | Wt./ Gal., Lb. |
|---|---|---|---|---|---|---|---|---|
| Resin 1 | VBR-710 | Maleic rosin | Nelio Chemicals, Inc. | 145–155 | 290–310 | 10–2 | | 9.3–9.6 |
| Resin 2 | VBR-7026 | do | do | 140–145 | 280–300 | 8–10 | | 9.3–9.6 |
| Resin 3 | VBR-7015 | do | do | 128–138 | 210–225 | 9–11 | | 9.4–9.8 |
| Resin 4 | VBR-710LA | do | do | 135–145 | 245–260 | 9–11 | | 9.4–9.8 |
| Resin 5 | VBR-709 | do | do | 105–120 | 115–130 | 9–10 | | 9.5–9.8 |
| Resin 6 | VBR-1010 | Limed wood rosin | do | | | | | |
| Resin 7 | Helix | do | Newport Industries Company | | | | | |
| Resin 8 | Nulix 15 | do | do | | | | | |
| Resin 9 | Malix 138 | do | do | | | | | |
| Resin 10 | Amberol 820 | Maleic rosin | Rohm & Haas Company | 125–145 | 320–345 | 10–13 | | 10.0 |
| Resin 11 | Amberol 750 | do | do | 135–155 | 102–114 | | K-N [4] | 10.0 |
| Resin 12 | Limed Poly Pale | Limed rosin | Hercules Powder Company | (*) | 55 | | K [3] | 9.14 |

[1] 50% in toluene-alcohol. [2] Rosin scale. [3] Per standard rosin color scale. [4] Per standard rosin color scale, slightly more color than K alone.
*ASTM Ring and Ball softening point: 165° C.

Resin 7 is Helix, which is a limed, pale wood rosin, Acid No. 73, melting point (M.P.) (ASTM ball-and-ring) 271° F., lime content 5.5%, and color WG–N[1] manufactured by Newport Industries. Resin 8 is Nulix 15, which is a limed polymerized wood rosin, color M[1], Acid No. 57, M.P. (ball-and-ring) 334° F. and lime content 6.5%, manufactured by Newport Industries. Resin 9 is Malix 138, which is a limed, pale wood rosin, color M[1], Acid No. 66, M.P. (ball-and-ring) 280° F. and lime content 5.8%, manufactured by Newport Industries. Resins 10 and 11, the Amberol resins, represent a group of solvent-soluble, rosin-modified and unmodified, phenol formaldehyde and maleic-type resins in solid form.

Figure 1:
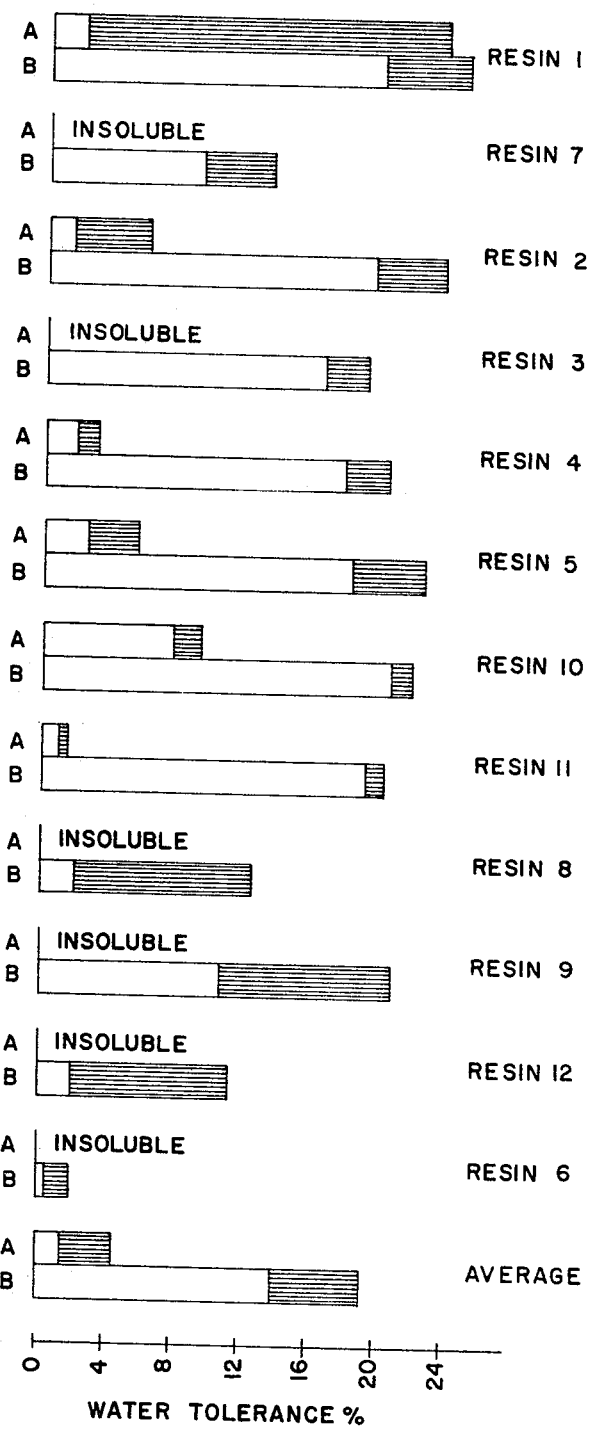

FIG. 1 is a bar graph showing a comparison of (A) DEG and (B) TMPD:DEG (1:1) as a solvent for several moisture-set ink resins (maleated rosin except where indicated) with respect to water tolerance. The water tolerance is shown both as the cloud point, the clear white area of each bar, and kickout point, the lined area of each bar. The cloud point is the percent water which can be added until the varnish becomes cloudy. The kickout point is the percent water required to actually precipitate the binder.

In addition to controlling the water tolerance, FIG. 1 shows that TMPD:DEG (1:1) has another advantage over DEG and other glycols with respect to solubility of lower cost limed rosins. The limed rosins are insoluble or have poor solubility in the more commonly used glycols but are readily soluble in TMPD:DEG (1:1).

Figure 2:
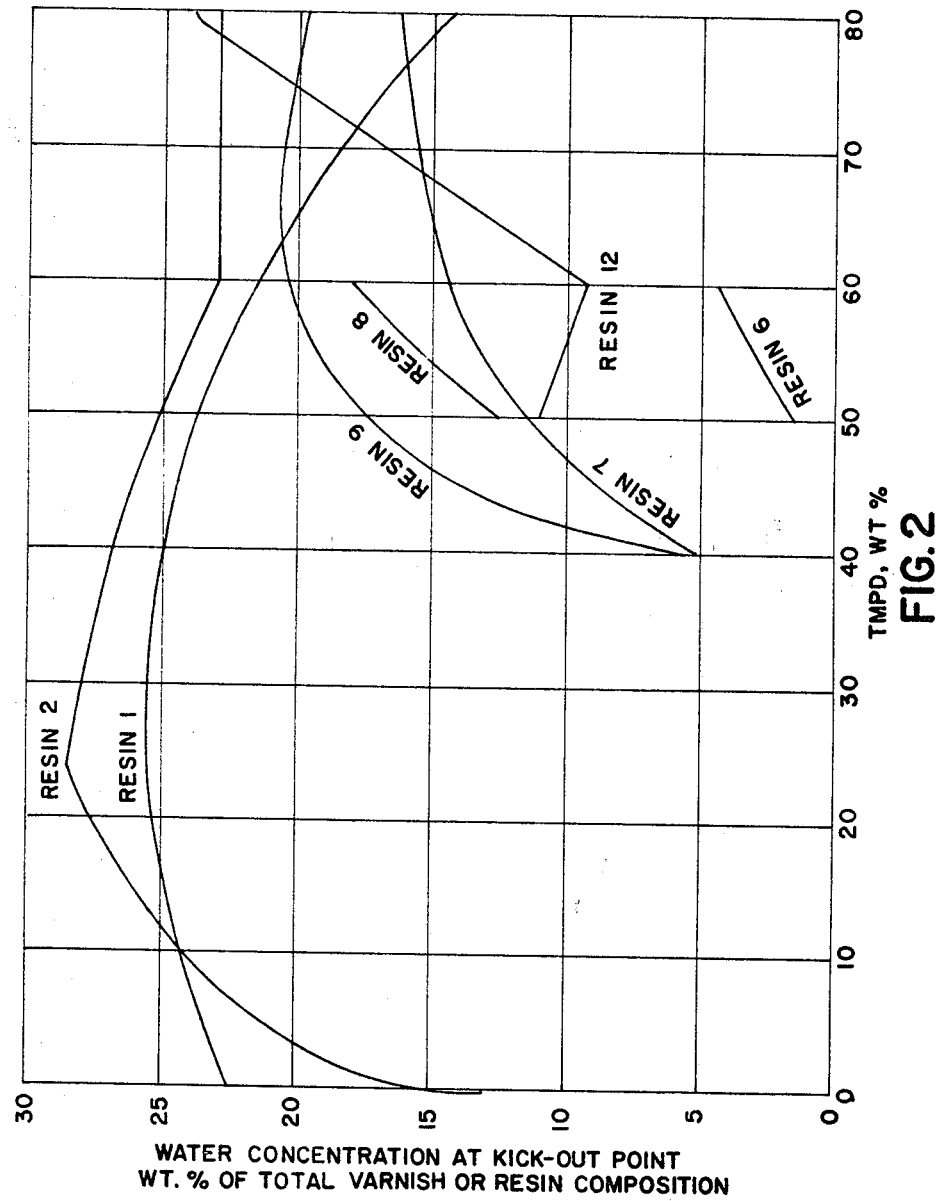

FIG. 2, in plotting water concentration at kickout point against weight percent TMPD, shows that by incorporating TMPD the stability of the ink in the presence of water can be increased. Furthermore, the optimum concentration to give the maximum degree of resistance to precipitation by water is shown as represented by the high point of the curve for each of the resins.

Figure 3:
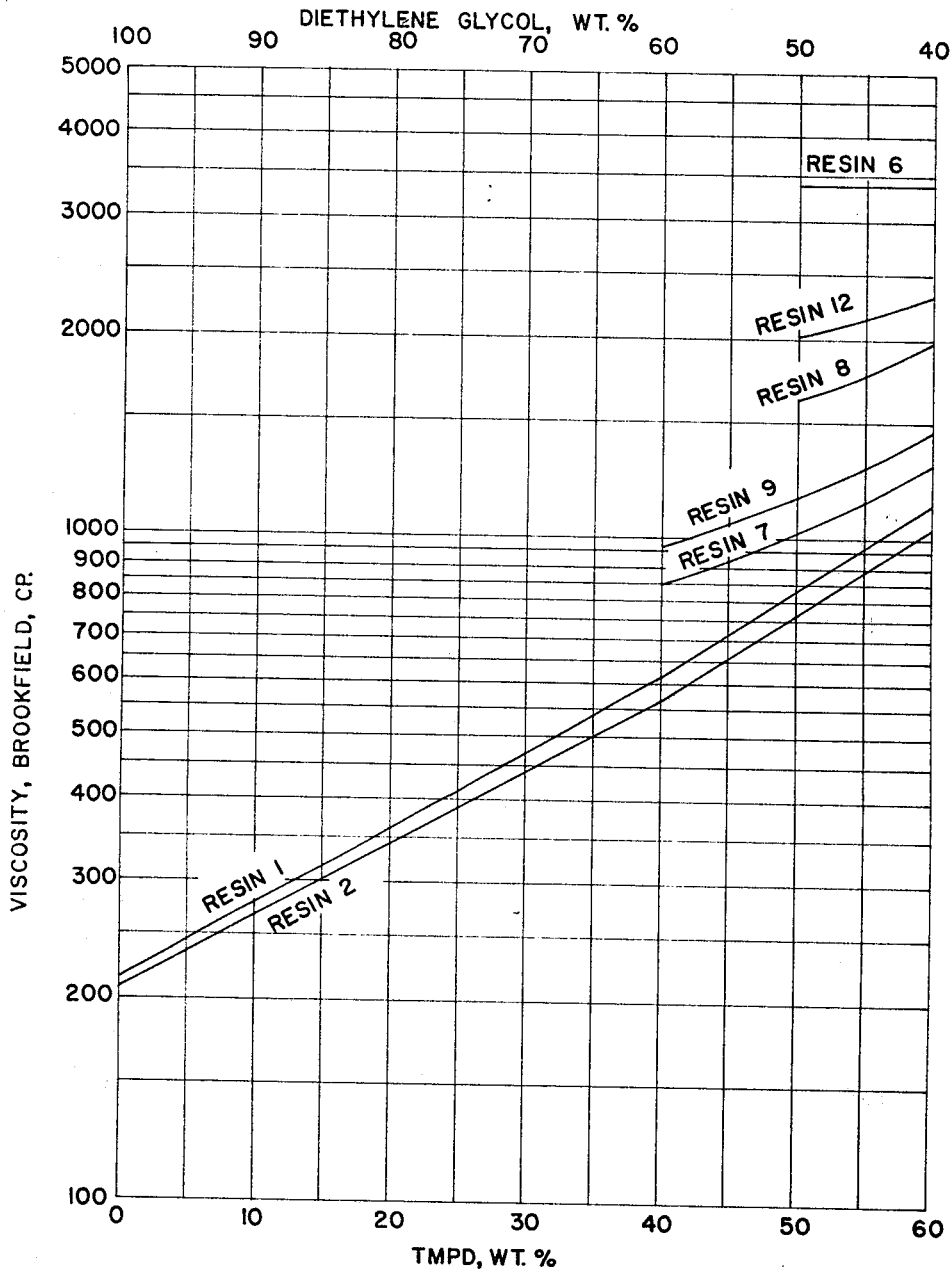
FIG. 3 is a graph in which the amount of TMPD in the TMPD/DEG resin solvent is plotted against the Brookfield viscosity.

FIG. 3 illustrates how TMPD may be used as a constituent of solvent mixtures in moisture-set inks as an economical way of increasing ink viscosity when an increase in viscosity is desirable. By using TMPD higher viscosity may be obtained by increasing the TMPD content and keeping the resin content constant. This permits a saving which would otherwise be impossible. Heretofore a higher amount of a sometimes rather expensive resin component had to be used for the same purpose.

Figure 4:
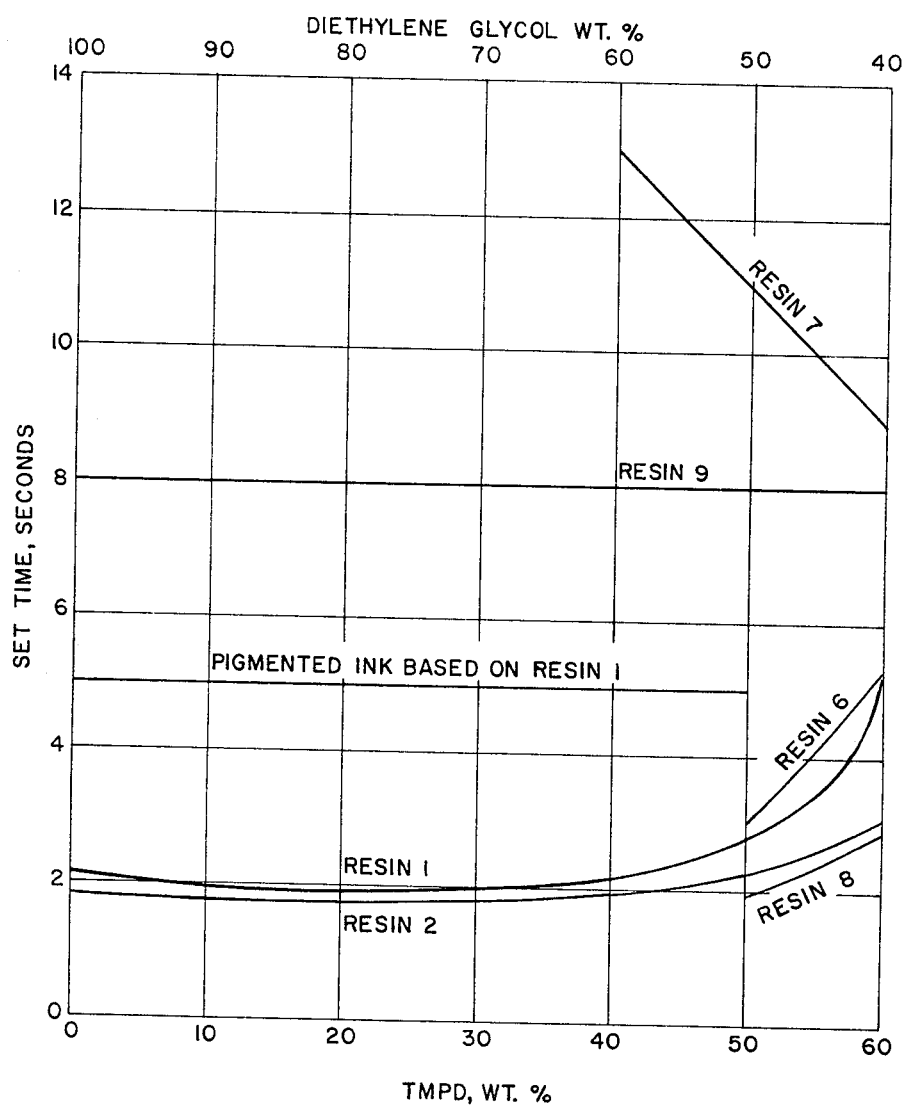
FIG. 4 is a graph showing the effect of TMPD on the steam set times of our moisture-set varnishes and inks. In the graph the weight percent of TMPD is plotted against the set time in seconds for various resin-containing ink compositions.

In the tests recorded in graphical form in FIG. 4 the vehicles and inks were applied with a hand-proofer to unbleached kraft wrapping paper, which was then drawn through a steam chamber at 210° F. (99° C.). As may be seen by an examination of the graph (FIG. 4), increasing the concentration of TMPD tends to increase the time required for the vehicle to set. For the most part the increase was less than one second when the concentration of TMPD was less than 50%. For most of the resins tests at below 30% TMPD the time required for the vehicle to set was decreased somewhat.

Preferred properties of a TMPD which we have found

Table 1.—Typical physical properties of TMPD

Specifications:
Assay, by gas chromatography, wt. percent _____ min__ 96.0
Melting point range, ° C. _____ 46–55
Boiling range, 760 mm., ° C.:
   Initial boiling point _____ min__ 215
   95% _____ max__ 235
Molten color, APHA [1], p.p.m. _____ max__ 50
Acid, as isobutyric acid, wt. percent __max__ 0.10

Other Properties:
Empirical formula _____ $C_8H_{18}O_2$
Molecular weight (calcd.) _____ 146.22
Physical form _____ white solid
Density, 21° C., lb./cu. ft. (g./cm.$^3$):
   Solid cake _____ 56 (0.893)
   Granulated _____ 43 (0.688)
Specific gravity:
   55°/15° C. _____ 0.928
   118°/15° C. _____ 0.883
   188°/15° C. _____ 0.835
Flash point, Cleveland Open Cup,
  ° F. _____ 235 (113° C.)
Fire point, Cleveland Open Cup,
  ° F. _____ 245 (118° C.)
Autoignition temperature (ASTM
  D 286-30), ° F. _____ 655 (346° C.)
Hygroscopicity, at equilibrium, 25° C.,
  50% R.H., wt. percent $H_2O$ _____ 0.1–0.2

[1] American Public Health Association color standard.

The following examples are further illustrative of our invention.

Example I

This example illustrates the low-temperature (−21° C.) stability of our TMPD:DEG blend. TMPD, a solid at room temperature, was blended with DEG to make the mixtures shown in the following table (Table 2). Solution stability is indicated by the time and solubility columns in the table for a 40–60% TMPD range.

TABLE 2.—LOW TEMPERATURE (−21° C.) SOLUTION STABILITY OF TMPD IN DEG

| Percent TMPD | Time | Seeded | Solubility |
|---|---|---|---|
| 40 | 48 | No | Soluble. |
| 40 | 1.5 | Yes | Do. |
| 50 | 16 | No | Do. |
| 50 | 1.5 | Yes | Crystallized. |
| 60 | 16 | No | Do. |

Example II

The effect of TMPD upon press stability of pigmented moisture-set inks was determined by dynamic roll tests. Moisture-set ink vehicles were prepared by heating 30% by weight resin and 70% by weight solvent at approximately 150° C. (302° F.) for a period of ten minutes. The mixtures were manually agitated until solubility was obtained. Before testing the vehicles were allowed to cool to room temperature. The ink formulations used in these tests are given in Table 3, which follows:

TABLE 3.—PIGMENTED MOISTURE-SET INK FORMULAS

| Ingredients | Weight Percent | | |
|---|---|---|---|
| | 1 | 2 | 3 |
| VBR-710 | 30.0 | 30.0 | 30.0 |
| India Red Pigment | 12.8 | 12.8 | 12.8 |
| DEG | 57.2 | 45.7 | 28.6 |
| TMPD | | 11.5 | 28.6 |
| | 100.0 | 100.0 | 100.0 |
| Viscosity, cp | 3,500 | 8,535 | 39,535 |

The press stability of the ink formulations of Table 3 is reported in Table 4 below. Table 4 shows that increasing the proportion of TMPD increased the time the ink remained stable during the dynamic-roll test.

TABLE 4.—PRESS STABILITY [1] OF PIGMENTED MOISTURE-SET INKS [2]

| TMPD, Percent Total Solvent | Diethylene Glycol, Percent Total Solvent | Time to Failure, Minutes [3] |
|---|---|---|
| 0 | 100 | 14.4 |
| 20 | 80 | 16.4 |
| 50 | 50 | 27.5 |

[1] Determined on IGT Inking Mechanism at 72° F. (22° C.) and 50% Relative Humidity.
[2] See Table 3 for ink formulations.
[3] Average of three determinations.

From the foregoing description and examples it is thought readily apparent that we have provided an improved solvent for moisture-set inks as well as improved moisture-set inks made therefrom.

Generally two of the most important requirements of moisture-set inks are: (1) the water tolerance of the ink must be sufficiently high for the ink to remain fluid on the press during periods of high humidity; and (2) the water tolerance most be low enough to facilitate drying of the ink in a reasonable time when printed on paper and subjected to moisture. Both of these requirements are satisfied by use of TMPD/DEG blends according to our invention.

An advantage offered by the use of TMPD:DEG (1:1) as a solvent for moisture-set inks is a method of controlling the water tolerance of the inks. TMPD:DEG (1:1), when used as a replacement for DEG, increases the water tolerance of the moisture-set varnishes as much as tenfold. In cases where the water tolerance is too high to insure proper drying after printing, water may be added directly to the varnish to control the drying rate.

A further advantage of use of a TMPD/DEG mixture in moisture-set inks is that it provides a way of dissolving certain lower-cost limed rosins heretofore not usable in such inks. The ink compositions of our invention have improved insensitivity to moisture and improved press stability. In general, our preferred blend of TMPD/DEG is approximately a 1:1 mixture (45-55% by weight each component). This is because above and below this concentration for either component the water tolerance tends to decrease somewhat.

TMPD offers the ink maker a method of controlling the water tolerance of the ink, a method of controlling the press stability, and a method of controlling the set time of the printed ink. TMPD improves the water tolerance of moisture-set ink varnishs.

Although the invention has been described in considerable detail with particular reference to certain preferred embodiments thereof, variations and modifications can be effected within the spirit and scope of the invention as described hereinabove, and as defined in the appended claims.

We claim:
1. A solvent blend consisting essentially of 20–60% by weight 2,2,4-trimethylpentanediol-1,3 and 80 to 40% by weight diethylene glycol, said blend being adapted for use in dissolving the resin component of a moisture-set ink composition.

2. The blend of claim 1 wherein the amount of 2,2,4-trimethylpentanediol-1,3 is about 50% by weight and the amount of diethylene gylcol is about 50% by weight.

3. A moisture-set ink composition comprising 6–44% by weight rosin resin, 44–6% by weight pigment, 5–45% by weight diethylene glycol, and 45–5% by weight 2,2,4-trimethylpentanedol-1,3.

4. The composition of claim 3 wherein the amount of rosin resin is 20–30% by weight, the amount of pigment is 30–20% by weight, the amount of diethylene glycol is 20–30% by weight, and the amount of 2,2,4-trimethylpentanediol-1,3 is 30–20% by weight.

5. The composition according to claim 3 wherein the rosin resin is a limed rosin and the pigment is selected from the group consisting of carbon black, India red, chrome yellow, titanium dioxide, phthalocyanine blue, phthlaocyanine green, molybdate orange, iron blue, zinc yellow, watchung red, BON red, and iron oxide.

6. A method for preparation of an improved moisture-set ink composition which comprises heating a mixture comprising about 30% by weight rosin resin and 70% by weight glycol solvent comprising about equal amounts of diethylene glycol and 2,2,4-trimethylpentanediol-1,3 with agitation for a period of about ten minutes, thereby obtaining a substantially uniform moisture-set ink vehicle, applying the vehicle to a substrate, and depositing same thereon by subjecting the substrate with ink vehicle applied thereto to a jet of moisture, thereby combining the moisture with the ink and precipitating the binder to produce a firm, continuous film, with absorption of the solvent into the substrate.

7. The process of claim 6 wherein the rosin resin is a limed rosin.

References Cited
UNITED STATES PATENTS

| 2,294,711 | 9/1942 | Bjorksten | 106—311 XR |
| 2,437,908 | 3/1948 | Chiappe et al. | 106—30 |
| 2,657,148 | 10/1953 | Ghrlich | 106—311 XR |
| 2,700,685 | 1/1955 | Cooper et al. | 260—635 XR |
| 2,829,169 | 4/1958 | Hagemeyer | 260—635 XR |

FOREIGN PATENTS

| 558,512 | 6/1919 | Canada. |

JULIUS FROME, Primary Examiner.
J. B. EVANS, Assistant Examiner.